United States Patent [19]

Lorimer

[11] Patent Number: 4,595,252
[45] Date of Patent: Jun. 17, 1986

[54] HOLOGRAM IMAGING SYSTEM AND RECORDING METHOD

[76] Inventor: John M. Lorimer, 128 E. Drummond, Glendale Heights, Ill. 60139

[21] Appl. No.: 730,510

[22] Filed: May 6, 1985

Related U.S. Application Data

[63] Continuation-in-part of Ser. No. 383,809, Jun. 1, 1982, abandoned.

[51] Int. Cl.⁴ .............................................. G03H 1/02
[52] U.S. Cl. ................................................... 350/3.79
[58] Field of Search ............ 350/3.79, 3.82, 3.83–3.86

[56] References Cited

U.S. PATENT DOCUMENTS

| | | | |
|---|---|---|---|
| 3,547,510 | 12/1970 | De Bitetto | 350/3.79 |
| 3,606,517 | 9/1971 | Jacobson et al. | 350/3.79 |
| 3,612,640 | 10/1971 | Kogelnik | 350/3.79 |
| 3,625,584 | 12/1971 | St. John | 350/3.79 |
| 3,697,149 | 10/1972 | Van Heeckeven et al. | 350/3.79 |

*Primary Examiner*—Bruce Y. Arnold
*Attorney, Agent, or Firm*—Douglas B. White

[57] ABSTRACT

An improved motion picture hologram imaging system and recording method is provided wherein the hologram film comprises a sequence of frames along the length of the film and wherein the frames are composed of multiple horizontally aligned narrow vertical slit holograms spaced across the width of the film with each slit hologram representing a view of the object scene from varying angles.

4 Claims, 9 Drawing Figures

HOLOGRAM IMAGING SYSTEM AND RECORDING METHOD

This is a continuation in part of application Ser. No. 383,809, filed June 1, 1982 now abandoned.

BACKGROUND OF THE INVENTION

The present invention relates generally to holographic motion picture processes and more particularly to means for generating a moving quasi-three-dimensional image by a construction of a Fourier Transform hologram constructed from two-dimensional photographs or similar information. Methods used in this system comprise recording the Fourier Transform hologram from two-dimensional photographs, or use of a computer to calculate appropriate holograms from information extracted from stereo photographs, or other data.

Prior art using narrow strip holograms is exemplified by the patent to DeBitetto, U.S. Pat. No. 3,547,510. In that patent there is described a system of creating narrow strip holograms by mounting a plurality of strips on a continuously moving film transport, whereby image motion may be observed without the necessity for employing shutter mechanisms and film stepping devices. In his system, an array of narrow horizontal bands are arranged transverse to the length of the film strip.

The present invention comprises, in contrast, a series of discrete frames oriented vertically along the length of the film. Each frame consists of an array of narrow vertical holographic bands aligned horizontally across the width of the film. Each successive frame contains sequential scenes of the object. Each successive vertical slit hologram across the width of the film contains sequential perspectives of the object. In this manner the image of a three-dimensional object scene is resynthesized from two-dimensional photographs and the object scene may undergo movement. Unlike DeBitetto's system and others, the nature of the movement within the object scene is independent of constraints imposed by the transport mechanism.

In an alternative embodiment of the present invention there is provided a computerized method of generating a halographic motion picture comprising feeding data of real or imaginary scenes into a computer, as from stereo photos, and generating, by computer calculation, the holographic interference pattern necessary to reconstruct this scene. After a sequence of such holographic frames are plotted on holographic film the resulting holographic picture may be reconstructed on a playback device.

SUMMARY OF THE INVENTION

Generally there is provided in one aspect of the present invention a laser illuminated two-dimensional transparency (e.g., 16 millimeter film) projected onto a ground glass diffuser. There is further provided a laser light source diverging from a point on the same plane as the image projected on the ground glass. Light from both the diverging reference beams and the projected image (object beam) pass through a condenser lens placed exactly one focal length from this plane. The interference pattern which therefore occurs on the other side of the condenser lens is recorded on the film through a slit mask. On reconstruction a laser reference beam is used to illuminate the holographic film to produce the holographic images.

It is therefore a primary aim of the present invention to provide an improved hologram generating and reconstruction system incorporating principles of Fourier Transform holography to accomplish a quasi-three-dimensional constant velocity imaging system. Other objects and advantages of the invention will become apparent upon reading the following detailed description and upon reference to the drawings, in which.

DESCRIPTION OF THE PREFERRED EMBODIMENT

Figure 1:
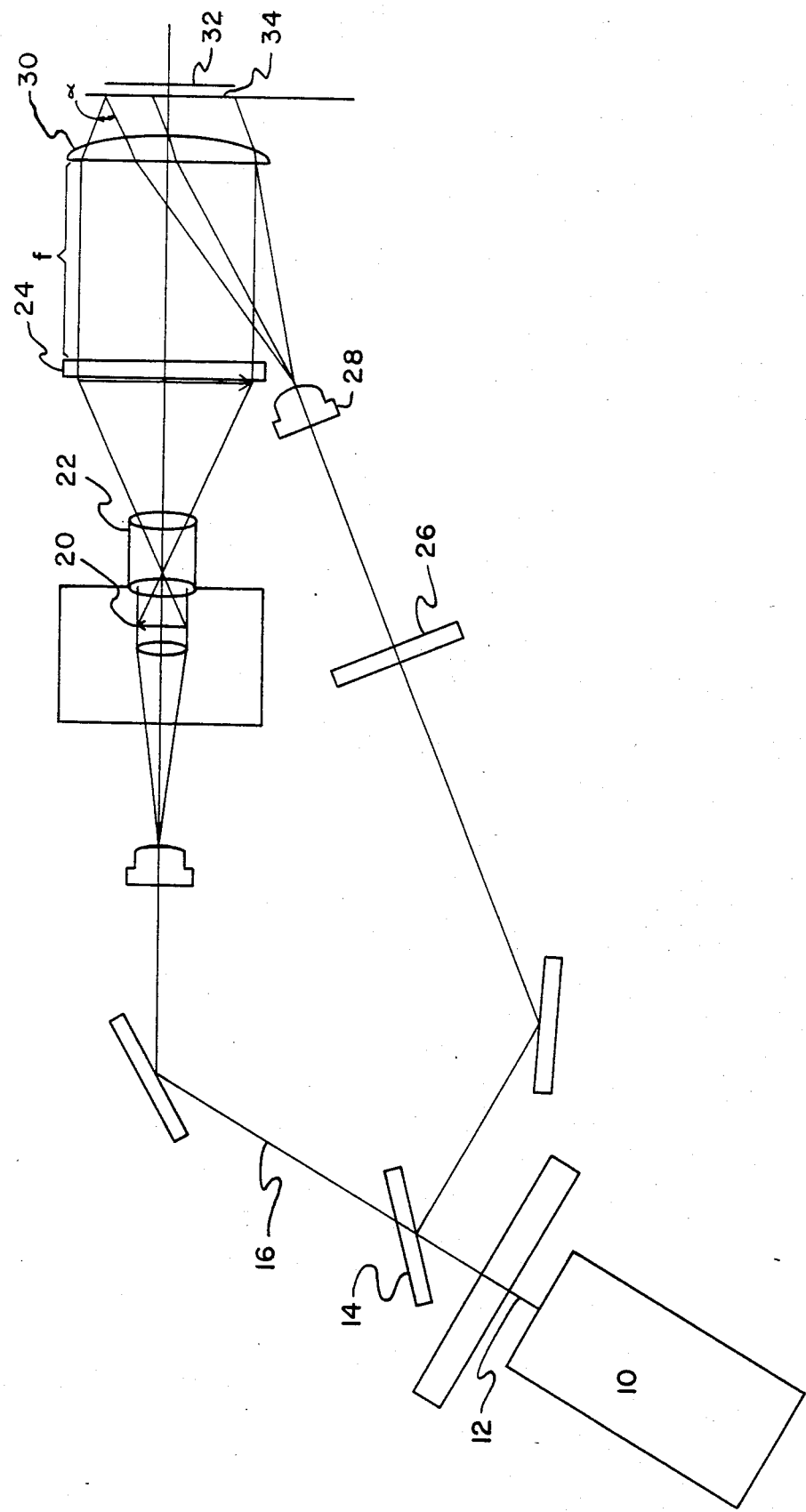
FIG. 1 is a schematic view of the holography generating system of the present invention showing generation of a hologram from a two-dimensional transparency.

Turning now to FIG. 1 there is shown a laser 10 providing a beam 12, which beam is split by a beam splitter 14, with one beam 16 proceeding on, passing through a lens, coming to a focus, and then diverging and impinging on the object scene 20. In this preferred embodiment the object scene is a two-dimensional transparency such as 16 millimeter film which is incremented past the object plane. The light passing through this transparency is focused through a projection lens 22 onto a ground glass screen 24. The light scattered by the ground glass screen passes through a condensor lens 30 positioned exactly one focal length from the ground glass screen (where the focal length is the focal length of the condensor lens 30). In this way, a Fourier Transform of the object scene is produced in the region of the film 32. Meanwhile the reference beam is transmitted through a neutral density filter 26 and passed through a lens 28 such as a 40× microscope objective. The reference beam is focused to a point on the same plane as the ground glass screen and then diverges. The diverging reference beam passes through condensor lens 30 and emerges collimated. The interference pattern created by the intersection of the object and reference beams at the surface of the film 32 makes it possible to holographically record the Fourier Transform of the object scene. The holographic recording is limited to a thin vertical area on the film by slit mask 34.

Figure 3:
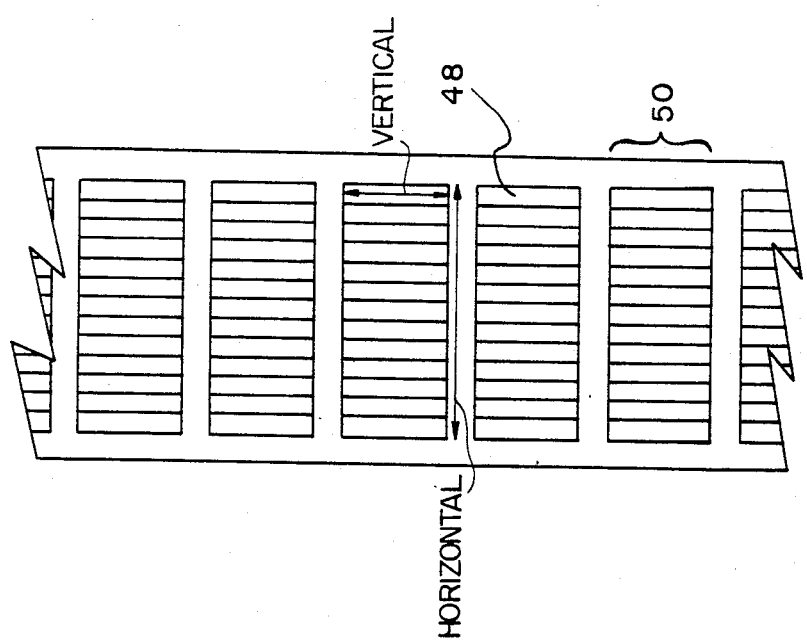
FIG. 3 is an elevational view of the film generated by the system of FIGS. 1 and 2.
Figure 2:
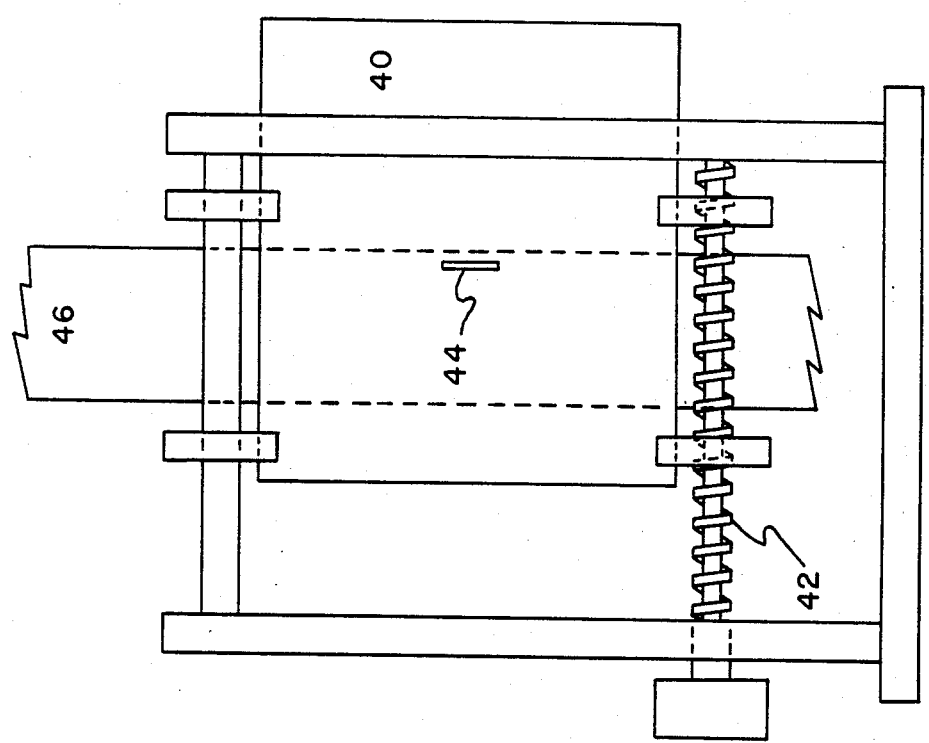
FIG. 2 is an elevational view of one embodiment of a slit mask apparatus for generating the multiple vertical slit hologram.

Turning now to FIG. 2 there is shown a basic form of the slit mask apparatus showing an opaque mask 40 having a narrow slot of approximately 2.5 millimeters×12 millimeters. Positioning this mask is a screw drive 42 which selectively positions the slit 44 by designated increments across the film 46. In this manner a row of vertical strips 48 may be laid out across the film as successive perspectives of the object scene are projected from the 16 mm film onto the ground glass. For example, the first 16 mm transparency represents an object scene photographed from a particular perspective. That perspective is holographically recorded as a Fourier Transform in a slit at one edge of the holographic film. Then the 16 mm film is advanced to the next frame which corresponds to a successive perspective of the same object scene, the slit is incremented one position and another slit hologram is recorded next to the first. This process is continued until the slit has been incremented across the film. A single completed frame, therefore, consists of an array of vertical bands on each of which is holographically recorded a different perspective of the same object scene. Multiple sets of vertically aligned strips are recorded as sequential frames 50 corresponding to sequential scenes of the object. For example, once the first row of slits has been recorded, the 16 mm film is advanced to the next frame which now represents a new phase of the object scene (which may or may not be related to the previous phase) but from the first perspective. The photosensitive film is advanced one frame, the slit mask is returned to its original position and the above process is repeated. The 16 mm film may be produced in a number of ways such as through conventional motion picture animation techniques, through the use of multiple interlocked motion picture cameras, or through conventional computer graphic animation techniques. The completed film strip is represented in FIG. 3. In a further aspect of the preferred embodiment of the intervening segments between frames may be virtually eliminated.

Figure 4:
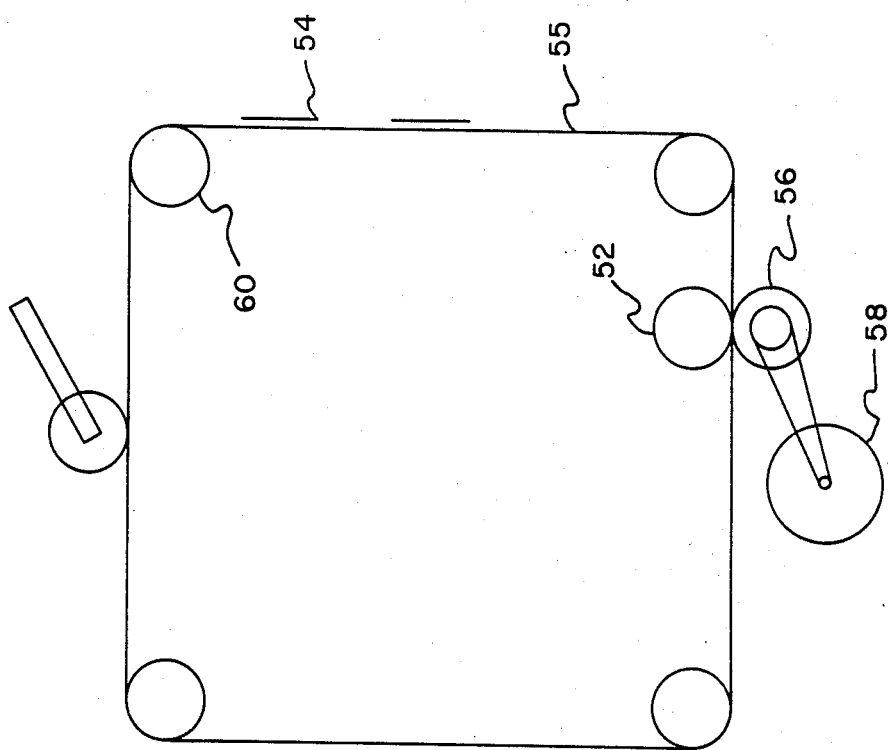
FIG. 4 is a schematic of the transport system of the present invention.

FIG. 4 shows a method of transport used for the reconstruction process of a film strip of the present invention where the film strip is formed into a continuous loop. There is provided tension rollers 52, a viewing mask 54, the holographic film 55, a drive capstan 56 and motor 58, and guide rollers 60. When properly illuminated as described below the holographic movie may be viewed through the mask.

Figure 5A:
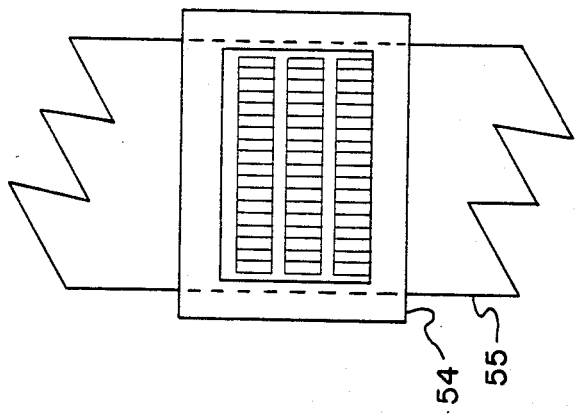
FIG. 5A is an elevational view of the film and viewing area of the present invention viewed along section line AA illustrated in FIG. 5.
Figure 5:
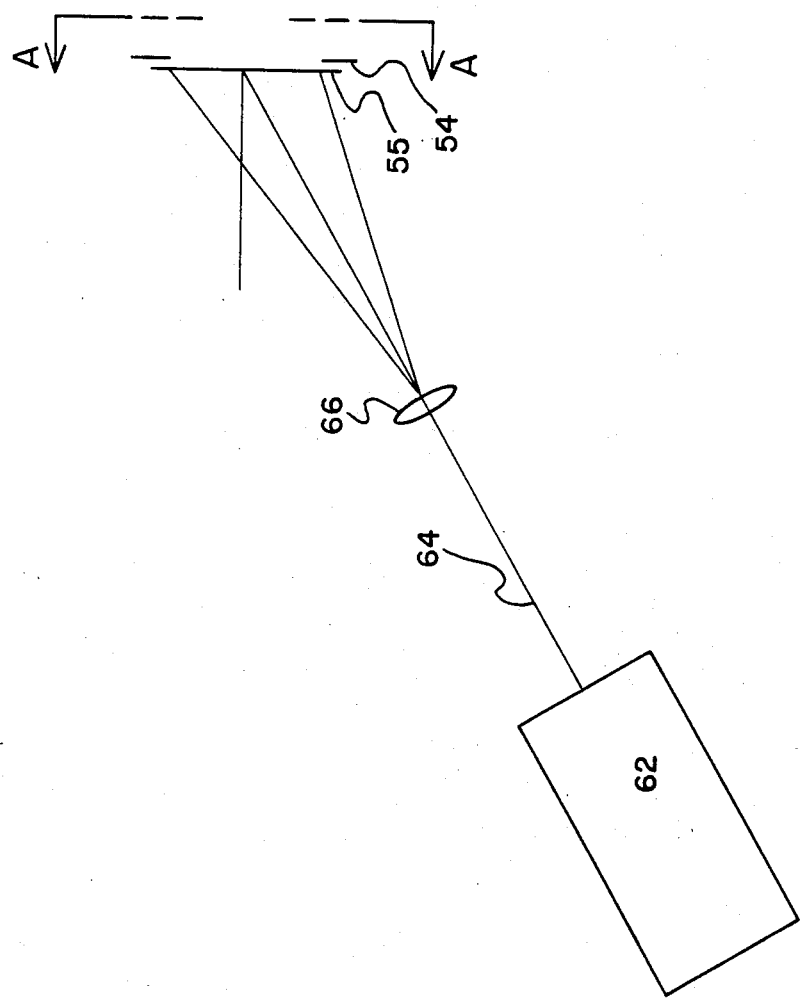
FIG. 5 is a schematic of the reconstruction method of the present invention.

Turning now to the reconstruction configuration shown in FIG. 5, there is provided a reference beam laser 62, with one beam 64 proceeding through a lens 66, coming to a focus and then diverging and impinging upon the holographic film in the vicinity of the mask opening. The film is moved past the reconstruction beam using the transport device of FIG. 4. During recording of each holographic strip, condensing lens 30 is positioned exactly one focal length away from the surface of the ground glass 24 onto which the image is projected. This condition assures that the cone of light emanating from any given point on this plane will emerge from lens 30 collimated and will strike the exposed surface of the photosensitive film everywhere at the same angle. Also since the reference beam is focused to a point on this same plane and then allowed to diverge, it too will emerge from lens 30 collimated. Therefore the intersection of light from these two beams will form the same angle $\alpha$ everywhere on the exposed surface of the film. Therefore, any given image point will be represented on the film by an interference pattern which is uniform across the exposed surface of the film. In reconstruction, this allows the film to be continuously moved vertically without displacing the image in space.

Figure 8:
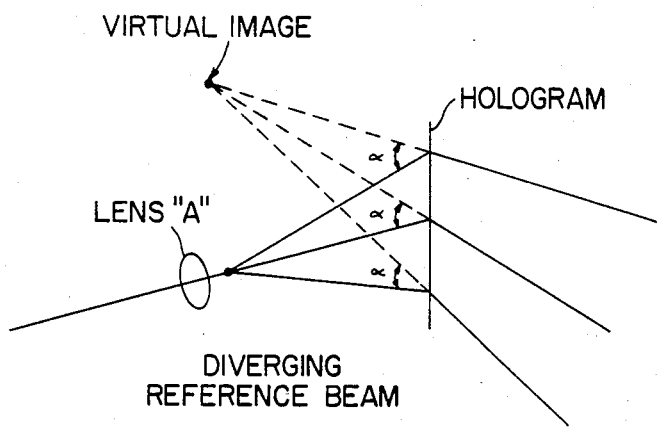
FIG. 8 illustrates hologram reconstruction using a diverging reference beam.
Figure 6:
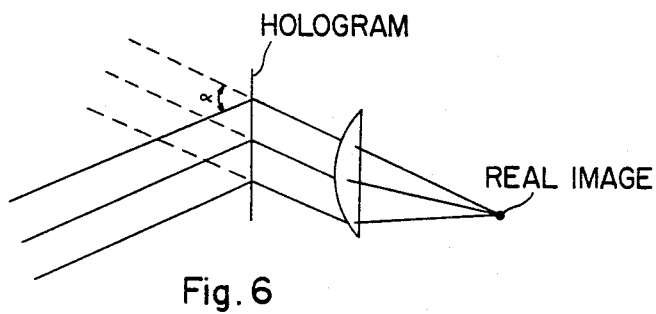
FIG. 6 illustrates hologram reconstruction using a concave lens.
Figure 7:
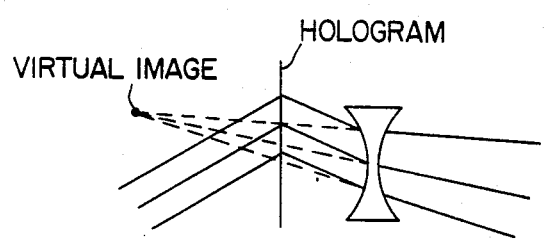
FIG. 7 illustrates hologram reconstruction using a convex lens.

If the hologram were to be reconstructed using a collimated reference beam which is an exact time reverse of the generation conditions, as is conventional, the light representing the reconstructed image, for any given point, would be collimated (i.e., it would not form an image at all but rather the Fourier Transform of the image). It is first necessary to convert the Fourier Transform back into an image by the use of another lens. If a concave lens were introduced into the light emerging from the film, a real image would be formed in front of the lens as in FIG. 6. If a convex lens were introduced into this light, a virtual image would be formed behind the lens as in FIG. 7. A virtual image can also be accomplished by using a diverging reference beam as in FIG. 8. Laser light striking the hologram will be diffracted by the recorded interference pattern at an angle equivalent to the angle of intersection of the object and reference beams when the hologram was recorded (assuming the same frequency laser). In the case of the image point mentioned above, that angle will be $\alpha$. If the reference light is itself diverging, the change in its angle of incidence to the film will be added to angle $\alpha$ resulting in a diverging image beam which will produce a virtual image a distance of one focal length behind the surface of the film where the focal length is the focal length of the convex lens "A".

In the method of reconstruction whereby a virtual image is produced by a diverging reference beam, for each frame a series of virtual images will be produced, each corresponding to one vertical slit hologram. These virtual images will all be superimposed at a plane in space one focal length behind the holographic frame. However in viewing any given point, the angle of view of each eye will intersect primarily one vertical slit at a time and thus only one virtual image will be visible to that eye at a time. Since the viewer's left eye selects a different image than his right eye, and since that image represents a different perspective of the scene, these two stereo pairs will produce a three-dimensional illusion. Furthermore, if the viewer moves his head laterally with respect to the film, his eyes will select a sequence of stereo pairs which represent progressive shifts in perspective which will produce the illusion of parallax shift.

As mentioned previously, since each vertical slit represents a uniform holographic record (Fourier Transform) the film may be moved vertically and the image will remain stationary. As the new frame enters the beam and the old frame leaves it, the two sets of images will superimpose, creating the effect of one image "dissolving" into the next. The mask 54 serves to restrict extraneous light and to control the transition between frames. If the height of the mask exceeds the height of one frame, the frames will dissolve gradually into each other since two or more frames are visible simultaneously. If the height of the mask is significantly less than the height of the frame, then a frame will hold, dissolve rapidly to the next frame, and hold again. In this way, by moving the frames past the beam, the viewer detects continuous motion.

In a further aspect of the present invention, using present computer technology, a three-dimensional object or subject may be computed and stored in a computer. The subject would be stored in a computer in a three-dimensional coordinate system, and the computer would calculate those coordinates based upon either manipulations of a mathematical model as in the case of an imaginary scene, or from parallax data obtained by mathematical comparison of stereo pairs of two-dimensional perspectives. These two-dimensional perspectives may be extracted from engineering designs or models, or other data sources. The computer would then generate different holographic patterns representing a series of scene perspectives corresponding to the plurality of slits previously discussed and described in connection with the present invention. A computer controlled plotter would then be employed to plot the computed interference pattern on film frames corresonding to each computed view. One way this may be accomplished would be the following. A computer would generate data representing a series of views of an imaginary object. This manipulation is frequently done, for example, in architectural design. Each of those views would be converted to data representing a Fourier Transform holographic interference pattern. This data would be plotted on holographic film but with each hologram occupying a distinct horizontally aligned vertical slit on the film. The computer would then generate another series of views of another phase of object motion and the procedure would be repeated for the next frame. The developed film is then fed into a hologram reconstruction arrangement as previously described.

Generally there has been shown and described an improved quasi-three-dimensional motion picture hologram imaging system and transport assembly and a film strip having a plurality of sequential frames wherein each frame is composed of a plurality of narrow horizontally aligned narrow vertical strip holograms, each representing a sequential angle of view of the object scene.

I claim:

1. An improved hologram imaging system comprising a length of film strip, a plurality of frames in sequential order spaced along the length of said film strip, wherein each of said frames is comprised of a plurality of horizontally aligned vertical parallel hologram strips adjacently positioned across the width of said film.

2. The hologram imaging system of claim 1 wherein said frames represent sequentially recorded frames.

3. An improved method for recording a holographic film strip frame of an object scene on photosensitive film using object and reference beam light sources comprising:
    a. interposing a vertically oriented slit mask between the photosensitive film and the object and reference beam light sources; and
    b. sequentially recording the hologram across the width of the film in multiple parallel horizontally aligned vertical strips, wherein each strip represents a view of the object scene recorded from a sequentially varied angle of view.

4. The method of claim 3 wherein said recorded holographic strips are Fourier Transform holograms.

* * * * *